(12) United States Patent
Periyaeluvan et al.

(10) Patent No.: US 12,373,123 B2
(45) Date of Patent: *Jul. 29, 2025

(54) METHODS AND SYSTEMS FOR DYNAMIC CONFIGURATION AND EFFECTIVE USAGE FOR ALLOCATING MEMORY IN MEDIA PRESENTATIONS OR LIKE DEVICES

(71) Applicant: DISH Network Technologies India Private Limited, Karnataka (IN)

(72) Inventors: Rakesh Eluvan Periyaeluvan, Bangalore (IN); Gopikumar Ranganathan, Bangaluru (IN); Jayaprakash Narayanan Ramaraj, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,372

(22) Filed: Jan. 3, 2024

(65) Prior Publication Data

US 2024/0134546 A1 Apr. 25, 2024

Related U.S. Application Data

(63) Continuation of application No. 16/932,060, filed on Jul. 17, 2020, now Pat. No. 11,899,949.

(51) Int. Cl.
*G06F 3/06* (2006.01)
*G06F 3/0482* (2013.01)

(52) U.S. Cl.
CPC .......... *G06F 3/0632* (2013.01); *G06F 3/0482* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 5,550,970 A | 8/1996 | Cline et al. | |
| 7,380,085 B2 * | 5/2008 | Matter .................. | G06F 9/5016 711/170 |

(Continued)

OTHER PUBLICATIONS

Kan, Michael, PCMag, YouTube Lowers Default Quality on all Videos to Standard Definition. Mar. 24, 2020. https://www.pcmag.com/news/youtube-makes-standard-definition-the-default-quality-on-all-videos (2 pages).

*Primary Examiner* — Jared I Rutz
*Assistant Examiner* — Edmund H Kwong
(74) *Attorney, Agent, or Firm* — KW Law, LLP (57) ABSTRACT

Methods and systems are provided for configuring static memory in a device by analyzing a set of functionalities of a first device based on at least one use case wherein the at least one use case are associated with configuring available static memory in processing at least one functionality of the first device; configuring at least a first profile composed of the first part for memory allocation of the available static memory to a first processor, and a second part for memory allocation of the available static memory to a second processor of the first device; selecting the first profile either automatically or via a graphical user interface (GUI) by identifying a set of performance characteristics related to the functionality, and implementing the memory allocation by the first profile in processing the at least one functionality in the use case by the first device.

20 Claims, 5 Drawing Sheets

(56) References Cited

U.S. PATENT DOCUMENTS

| | | | |
|---|---|---|---|
| 8,230,209 B1* | 7/2012 | Streuter | G06F 9/441 |
| | | | 713/1 |
| 9,864,681 B2 | 1/2018 | Walker | |
| 2003/0043638 A1* | 3/2003 | Chrisop | H04N 1/00352 |
| | | | 358/1.16 |
| 2004/0003063 A1 | 1/2004 | Ashok et al. | |
| 2004/0193783 A1 | 9/2004 | Sharma et al. | |
| 2008/0209079 A1* | 8/2008 | Caswell | G06F 13/387 |
| | | | 710/13 |
| 2011/0208934 A1 | 8/2011 | Tang et al. | |
| 2014/0089626 A1 | 3/2014 | Schluessler et al. | |
| 2014/0129958 A1* | 5/2014 | Garza | G06F 9/5077 |
| | | | 715/748 |
| 2015/0277929 A1 | 10/2015 | Paul et al. | |
| 2016/0116974 A1* | 4/2016 | Ginnela | H04M 19/04 |
| | | | 713/2 |
| 2017/0147226 A1 | 5/2017 | Oung et al. | |
| 2018/0109587 A1 | 4/2018 | Spilka et al. | |
| 2019/0042458 A1 | 2/2019 | Kumar et al. | |
| 2019/0373036 A1 | 12/2019 | Howard et al. | |

\* cited by examiner

METHODS AND SYSTEMS FOR DYNAMIC CONFIGURATION AND EFFECTIVE USAGE FOR ALLOCATING MEMORY IN MEDIA PRESENTATIONS OR LIKE DEVICES

PRIORITY CLAIM

This application is a continuation of U.S. patent application Ser. No. 16/932,060 filed on Jul. 17, 2020, which is incorporated herein by reference.

TECHNICAL FIELD

Embodiments of the subject matter described herein relate generally to media presentation devices, and more particularly, methods and systems to enable the dynamic configuring of memory used by processors in devices to enable an optimal memory usage by allocating parts of static memory composed of Random Access Memory (RAM) by the selection of profiles for different memory arrangements dependent on implemented use cases.

BACKGROUND

The term "streaming video" generally refers to the reception of multimedia content, such as television programming and other audiovisual content, through a communications network at a bitrate enabling presentation of the content in real-time as it is received. Streaming video may be viewed live or on-demand and transmitted by, for example, a Video On Demand (VOD) provider, a remotely-controlled place-shifting device, or a pay television provider delivering television programming via cable, satellite, or Internet (OTT) distribution channels. In the case of VOD or OTT television services, the media content may be stored in a pre-encoded format and distributed to a client media receiver, such as a mobile phone or STB, over a Content Delivery Network (CDN). Comparatively, in the case of placeshifted media, a DVR, STB, or a similar device having placeshifting capabilities and located within a user's residence may encode and transmit selected streaming video to a client media receiver, such as a mobile phone or tablet, operated by the end-user.

To enhance the performance characteristics of a device, it is desirable to allocate memory in processors of devices that support various functionalities based on use cases better. It is desirable to select device profiles by user input or automatically configure amounts to memory parts upon boot-up operations based on stored instructional sets.

Accordingly, it is desirable to change the static memory allocated between the main processor and a co-processor to improve performance characteristics, to provide a graphic reduce the complexity, and manual burdens associated with analyzing and configuring home entertainment systems to change the memory allocations for presentation devices to optimize memory usage to perform the function. Other desirable features and characteristics will become apparent from the subsequent detailed description and the appended claims, taken in conjunction with the accompanying drawings and the foregoing technical field and background.

BRIEF SUMMARY

Embodiments of systems and related configuration methods to allocate static memory amongst processors are provided. An exemplary method of configuring static memory using profiles for use cases for a device presenting media content and identifying and influenced by performance characteristics associated with client device coupled is provided.

In another embodiment, a method for configuring static memory in a device is provided. The method includes analyzing a set of functionalities of a first device based on at least one use case wherein the at least one use case is associated with configuring available static memory in processing at least one functionality of the first device; configuring at least a first profile comprising a first part for memory allocation of the available static memory to a first processor, and a second part for memory allocation of the available static memory to a second processor of the first device; selecting the first profile via a graphical user interface (GUI) by identifying a set of performance characteristics related to the at least one function for the first device, and implementing the memory allocation for a first static memory part and the memory allocation for a second static memory part as configured by the first profile in processing the at least one functionality in the use case by the first device.

In various exemplary embodiments, the method includes selecting a second profile via the GUI by identifying another set of performance characteristics related to at least one function for the first device; and implementing the memory allocation for the first static memory part and the second static memory part of the static memory defined by the second profile for processing the at least one function for another use case by the first device.

The method further includes selecting the first profile for implementing by the first device the at least one functionality related to streaming media content to a second device in accordance with the memory allocation for the first static memory part and the memory allocation for the second static memory part and further in accordance with a content quality parameter supported by the second device.

The method further includes in response to actuation of the first device, automatically instructing, by instructions stored in the memory of the first device during start-up to select a profile, a selection of a profile for implementation of the at least one functionality related to streaming media content to a second device in accordance with the memory allocation for the first static memory part and the memory allocation for the second static memory part and further in accordance with a content quality parameter supported by the second device. The available memory is a configured constant value composed of a sum of an amount of the first static memory part and the second static memory part. The method further includes configuring a relationship of an amount of allocated available memory of the first static memory part to the amount of the second static memory part wherein a change in either amount is compensated by an opposite change by another for a total sum of both amounts remains the configured constant value.

The method further includes identifying by the first profile a first performance characteristic associated with the at least one functionality for processing by the first processor with the allocated available memory. The method further includes identifying by the second profile a second performance characteristic associated with the at least one functionality for processing by the first processor with the allocated available memory.

The method further includes providing, at a client device, a graphical user interface display, including an indication of allocation of available memory of the first device resulting from the automatically configuring the available memory first device at actuation. The method further includes receiving, via a graphical user interface (GUI), a user input pertaining to allocation of available memory of the device for configuring an available memory by identifying a set of performance characteristics related to the at least one function for the first device; and providing, at a client device, feedback responsive to the user input, wherein the feedback is influenced by performance characteristics associated with a second device.

In another exemplary embodiment, at least one non-transitory computer-readable medium encoded with instructions which, when executed by a processor, performs a method for configuring static memory in a device is provided. The method includes analyzing a set of functionalities of a first device based on at least one use case wherein the at least one use case is associated with configuring available static memory in processing at least one functionality of the first device; configuring at least a first profile comprising a first part for memory allocation of the available static memory to a first processor, and a second part for memory allocation of the available static memory to a second processor of the first device; selecting the first profile via a graphical user interface (GUI) by identifying a set of performance characteristics related to the at least one function for the first device, and implementing the memory allocation for a first static memory part and the memory allocation for a second static memory part as configured by the first profile in processing the at least one functionality in the use case by the first device.

In various exemplary embodiments, the method includes selecting a second profile via the GUI by identifying another set of performance characteristics related to at least one function for the first device; and implementing the memory allocation for the first static memory part and the second static memory part of the static memory defined by the second profile for processing the at least one function for another use case by the first device. The method further includes selecting the first profile for implementing by the first device the at least one functionality related to streaming media content to a second device in accordance with the memory allocation for the first static memory part and the memory allocation for the second static memory part and further in accordance with a content quality parameter supported by the second device. The method further includes in response to actuation of the first device, automatically instructing, by instructions stored in the memory of the first device during start-up to select a profile, a selection of a profile for implementation of the at least one functionality related to streaming media content to a second device in accordance with the memory allocation for the first static memory part and the memory allocation for the second static memory part and further in accordance with a content quality parameter supported by the second device.

The available memory is a configured constant value composed of a sum of an amount of the first static memory part and the second static memory part. The method further includes configuring a relationship of the amount of allocated available memory of the first static memory part to the amount of the second static memory part wherein a change in either amount is compensated by an opposite change by another for a total sum of both amounts remains the configured constant value.

The method further includes identifying by the first profile a first performance characteristic associated with the at least one functionality for processing by the first processor with the allocated available memory and identifying by the second profile a second performance characteristic associated with the at least one functionality for processing by the first processor with the allocated available memory.

The method further includes providing, at a client device, a graphical user interface display, including an indication of allocation of available memory of the first device resulting from the automatically configuring the available memory first device at actuation. The method further includes receiving, via a graphical user interface (GUI), a user input about an allocation of available memory of the device for configuring an available memory by identifying a set of performance characteristics related to the at least one function for the first device; and providing, at the client device, feedback responsive to the user input, wherein the feedback is influenced by performance characteristics associated with the second device.

In yet another exemplary embodiment, a media system is provided to stream media content to a client over a network. The media system includes a control module configured to analyze a set of functionalities of a first device based on at least one use case wherein the at least one use case is associated with configuring available static memory in processing at least one functionality of the first device; configure at least a first profile comprising a first part for memory allocation of the available static memory to a first processor, and a second part for memory allocation of the available static memory to a second processor of the first device; select the first profile via a graphical user interface (GUI) by identifying a set of performance characteristics related to the at least one function for the first device, and implement the memory allocation for a first static memory part and the memory allocation for a second static memory part as configured by the first profile in processing the at least one functionality in the use case by the first device.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to configuring different devices involved with presenting media content for compatible operations with one another in an automated manner. As used herein, "media content," "media program," "multimedia content," or variants thereof should be understood as referring to any audiovisual programming or content in any streaming, file-based, or another format. The media content generally includes data that, when processed by a media player or decoder, allows the media player or decoder to present a visual and/or audio representation of the corresponding program content to a viewer (i.e., the user of a device including the media player or decoder). In one or more embodiments, a media player can be realized as a piece of software that plays multimedia content (e.g., displays video and plays audio).

Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

While placeshifting greatly improves the convenience afforded to the viewer, challenges can arise in effectively creating and transmitting the encoded media stream. The variety of network environments (e.g., LAN, WAN, Internet, wireless telephone, etc.) that may be supported can lead to significant variations in different receiver and client functionalities that are each allocated memory bandwidth for performance. For example, memory allocated and shared across a main and sub-processor may be not fully balanced for optimal usage dependent on the amount of memory required to perform each different functionality of multiple processes such as streaming, recording, encrypting etc. data between networks, clients, receivers etc.

While enhancing the ease and convenience with which end users view streaming video content, media streaming services are inherently limited by resource constraints affecting network reliability, processor capabilities and constraints in processing video and audio data, and bandwidth availability. When memory used by a device processor becomes overly constrained during a streaming video session, performance characteristics can suffer resulting in latencies in the presentation of streaming video content. Further, the processor latencies can also result in sluggish response times in implementing user-issued commands during a streaming video session, such as channel change commands issued by a user when streaming OTT television content.

Also, obstacles in processor operations can occur, for example a processor hit may be particularly problematic when a streaming media server, such as a consumer placeshifting device, engages in a multiclient streaming session with multiple client receivers. During such a multiclient streaming session, the processor may be required to perform computationally-intensive tasks related to concurrently encoding, packetizing, and transmitting separate video-containing media streams to two or more client media receivers, as well as responding to user commands received during the multiclient streaming session that are constrained by the processor's allocated static memory.

Memory can be configured as Random Access Memory (RAM) and Flash memory dependent on the number of clients needed and functionalities needed to assist in encoding, sending and other operations. The operating system of a device is held in RAM memory.

The RAM, is memory that is available to the system processor when the set-top is booted up and running. The RAM is used to run and execute applications, but RAM memory loses is cleared when the device (i.e. set-top box) is turned off, or if the content is not refreshed by an external charge. Hence, RAM is considered "readable/writable," meaning information, such as applications, can be written to, and read from its silicon, but not stored (without power), making it "volatile." Dynamic Random Access Memory (DRAM) caches and executes applications in the set-top. A set-top box is configured to cache streamed data in DRAM.

The present disclosure refers to static memory that includes Static RAM (SRAM) and Dynamic RAM (DRAM). SRAM is faster than DRAM and accordingly more expensive. Because of the way DRAM is constructed, with individual cells composed of a transistor and capacitor, the contents must be continually refreshed by an external circuit to be retained in memory. SRAM requires no refreshing and retains data. Because it's cheaper, DRAM is typically used in larger sizes. There are several different types of DRAM, including Synchronous DRAM (SDRAM), Double Data Rate RAM (DDR-RAM), and Extended Data Out RAM (EDO-RAM).

Set-top boxes use SRAM as a digital channel receiving buffer, or the "interleaving buffer." SRAM is used because the set-top processor requires fast access to RAM when processing video, but does not need to process a huge amount of data at once. DRAM is used for application execution, as a graphics rendering buffer and a MPEG decoding buffer. A memory configuration used by set-top boxes is 4 MB of Flash and 8 MB of DRAM. For the MSOs that were deploying boxes, the challenge is to utilize the fullest capacity of the available memory for functionalities to improve performance characteristics. Further HDTV requires additional memory in set-top boxes, 32 MB of memory is required for HDTV to decode streamed media. HD can be delivered via unified or dual memory architectures. Since most set-tops utilize unified memory, much of the available static memory capacity will not be used unless the set-top box is decoding HD.

Upon being turned on, the set-top box "boots up" by first performing a series of internal self-tests and then transferring the program instructions residing in the Ron-volatile memory to the main memory. Once the program instructions and any necessary data have been transferred to the main memory, the processor then starts executing the program instructions.

Systems, methods, and devices are provided for optimizing memory allocations for performing functions such as streaming video content, recording content, sending data, and other operations of streaming media from a media device to client based with variations in processor load. The methods, embodiments of the functionalities related to streaming content described are dependent on various use cases that may incur high transient processor loads or "processor hit" to the CPU. The overall stability of the video streaming session is consequently enhanced by allocating better memory in for the processor functionalities in streaming to provide a smooth and reliable playback experience to end-users. Additionally, embodiments of the below-described method may enable the streaming media device to more effectively utilize processor resources as such resources become available. This may further enhance viewer experience by enabling the generation of higher quality (e.g., higher resolution and/or higher frame rate) streams, which may not otherwise be generated in the context of conventional or default memory allocations.

Figure 1:
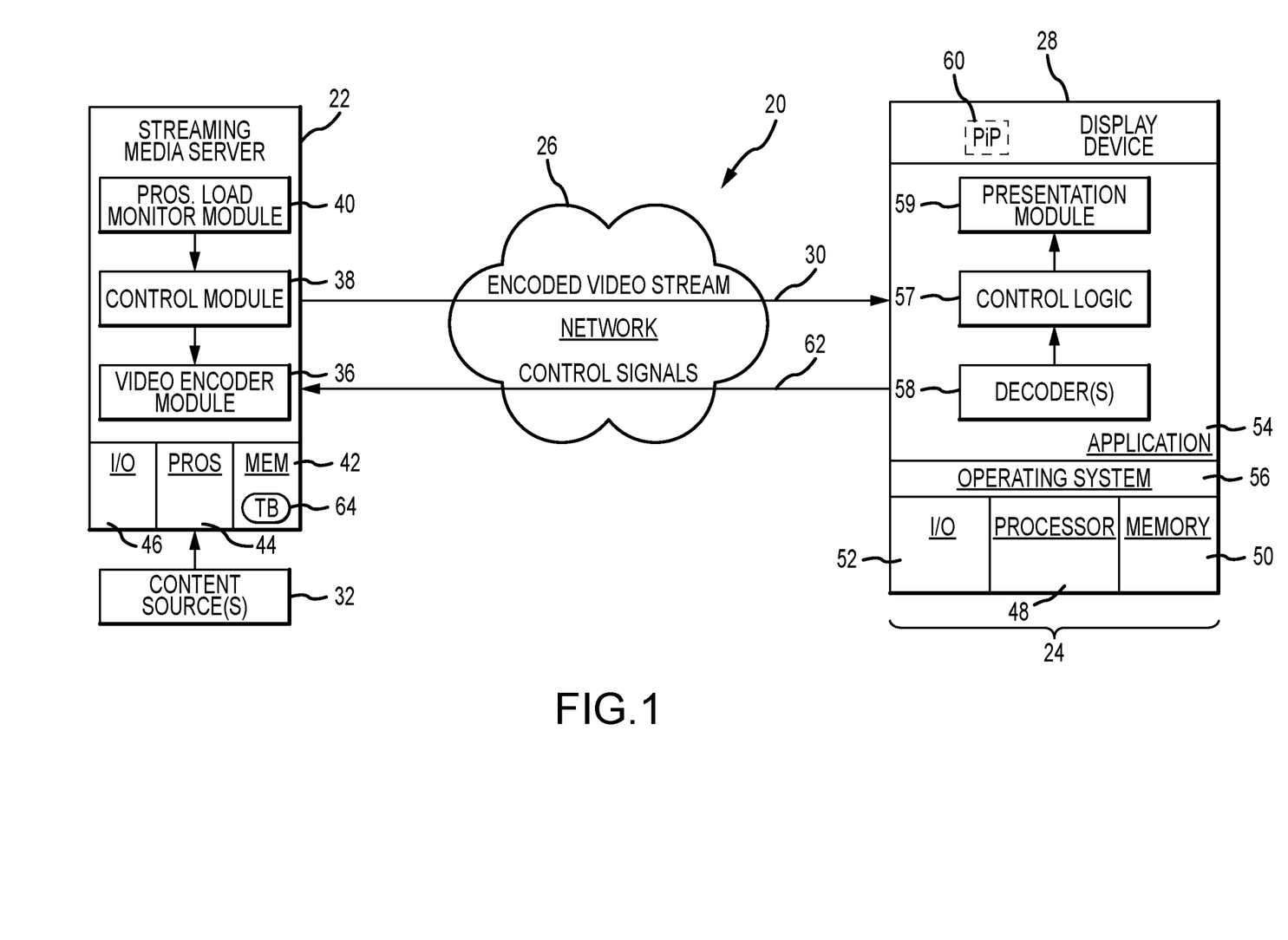
FIG. 1 depicts an exemplary schematic diagram of a streaming media system including a client media receiver which optimizes memory in response to variations in processor load, as illustrated in accordance with an embodiment of the present disclosure.

FIG. 1 schematically illustrates a streaming media system 20 including a streaming media server 22, which is suitable for applying the below-described processor load-responsive bitrate modification method during a streaming video session established between server 22 and at least one client media receiver 24. As depicted in FIG. 1, streaming media server 22 and, more broadly, streaming media system 20 are provided as generalized examples and should not be construed as limiting in any respect. In addition to streaming media server 22 and client media receiver 24, streaming media system 20 further includes a communications network 26 over which streaming video sessions are conducted. Communications network 26 may encompass any number of digital or other networks enabling bidirectional signal communication between server 22 and receiver 24 utilizing common protocols and signaling schemes. In this regard, communications network 26 can include one or more open CDNs, Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 26 may also encompass a cellular network and/or any other public or private networks.

During a given streaming video session, the streaming media server 22 encodes, packetizes, and transmits streaming video content over communications network 26 to client media receiver 24. The streaming video content will typically, but need not necessarily include accompanying audio content. As the content is received, client media receiver 24 decrypts (if needed) and decodes the streaming video content (also referred to as a "video stream" or a "media stream" herein). Client media receiver 24 utilizes the newly-decoded content to generate corresponding video output signals, which are supplied to display device 28 for viewing by an end-user operating receiver 24. The video output signals may be transmitted within a single electronic device or system when client media receiver 24 and display device 28 are combined as a unitary device, such as a smartphone, laptop computer, tablet computer, wearable device, or smart television (that is, a television containing an integrated receiver). Alternatively, in embodiments in which device 28 is realized as an independent electronic device separate and apart from receiver 24, such as a freestanding television set or monitor, client media receiver 24 may output the video output signals as wired or wireless transmission, which is then forwarded to display device 28.

In certain instances, streaming media server 22 may encode, packetize, and transmit a single video-containing media stream 30 during the streaming video session. In other instances, and as indicated in FIG. 1, streaming media server 22 may concurrently transmit multiple video-containing media streams as, for example, a streaming channel bundle provided pursuant to an Over-the-Top (OTT) television service. In still other instances, streaming media server 22 may concurrently provide separate video streams to multiple streaming media receivers 24; e.g., as may occur when server 22 assumes the form of a consumer placeshifting device, which provides streaming content to multiple client devices (e.g., smartphones, tablets, televisions, or the like) located within a user's residence or similar area. Regardless of the number of streaming channels or video streams provided by server 22 to receiver 24 (or receivers 24) during a given streaming video session, the streaming video content can be obtained from any number and type of content sources 32 in communication with or included within streaming media server 22. Content sources 32 can include, for example, content providers and aggregators external to streaming media server 22 and in communication with server 22 over communications network 26. Additionally or alternatively, content sources 32 can include any number and type of storage mediums accessible to streaming media server 22 (e.g., contained within or operably coupled to server 22) in which the video content subject to streaming is stored.

As appearing herein, the term "streaming media server" is defined broadly to encompass any device or group of operably-interconnected devices capable of encoding video content at an ABR value, which repeated adjusted in response to variations in processor load (and other factors) in the manner described herein. In the illustrated embodiment, specifically, streaming media server 22 includes at least one video encoder module 36, which operates under the command of at least one control module 38. Additionally, streaming media server 22 also includes a processor load monitoring module 40. While generically illustrated as a separate module in FIG. 1, processor load monitoring module 40 can be combined with control module 38 in certain implementations. Modules 36, 38, 40 can be implemented utilizing any combination of hardware and software (including firmware) components. For example, modules 36, 38, 40 may be implemented utilizing software or firmware embodied by code or computer-readable instructions residing within memory 42 and executed by at least one processor 44 (e.g., a CPU) further included in server 22. As illustrated, memory 42 generally depicts the various storage areas or mediums (computer-readable storage mediums) contained in streaming media server 22 and may encompass any number and type of discrete memory sectors. In embodiments, processor 44 may be a microprocessor, which is realized along with other non-illustrated components included in server 22 as a system-on-a-chip. Finally, it will be appreciated that streaming media server 22 may contain various other components known in the art including, for example, any number and type of Input/output (I/O) feature 46 enabling bidirectional communication with client media receiver 24 and, perhaps, other nodes or devices over network 26.

Client media receiver 24 can assume various different forms, including, but not limited, to that of a mobile phone, a wearable device, a tablet, a laptop computer, a desktop computer, a gaming console, a DVR, or an STB. When engaged in a video streaming session with streaming media server 22, client media receiver 24 generates video signals for presentation on a display device 28. As indicated above, the display device 28 can be integrated into client media receiver 24 as a unitary system or electronic device. This may be the case when receiver 24 assumes the form of a mobile phone, tablet, laptop computer, a smart television, or similar electronic device having a dedicated display screen. Alternatively, the display device 28 can assume the form of an independent device, such as a freestanding monitor or television set, which is connected to client media receiver 24, such as a gaming console, DVR, STB, or another peripheral device, utilizing a wired or wireless connection. In such embodiments, the video output signals may be formatted in accordance with conventionally-known standards, such as S-video, High Definition Multimedia Interface ("HDMI"), Sony/Philips Display Interface Format ("SPDIF"), Digital Video Interface ("DVI"), or Institute of Electrical and Electronics Engineers (IEEE) 1394 standards.

By way of non-limiting illustration, client media receiver 24 is shown as containing at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media receiver 24 may execute a software program or application 54 directing the hardware features of client media receiver 24 to perform the functions described herein. Application 54 suitably interfaces with processor 48, memory 50, and I/O features 52 via any conventional operating system 56 to provide such functionalities. The software application can be placeshifting application in embodiments wherein streaming media server 22 assumes the form of an STB, DVR, or similar electronic device having placeshifting capabilities and typically located within a user's residence. In some embodiments, client media receiver 24 may be implemented with special-purpose hardware or software, such as the SLINGCATCHER-brand products available from Sling Media Inc., currently headquartered in Foster City, California, and/or any other products.

With continued reference to FIG. 1, software application 54 suitably includes control logic 57 adapted to process user input, receive video-containing media stream 30 from streaming media server 22, decode the received media streams, and provide corresponding output signals to display device 28 in the above-described manner Application 54 decodes video-containing content stream 30 utilizing at least one decoding module 58, which may be implemented as specialized hardware or software executing on processor 48 in certain implementations. The decoded content is supplied to presentation module 59, which generates corresponding output signals transmitted to display device 28. In embodiments, presentation module 59 may also combine decoded programming to create a blended or composite image; e.g., one or more picture-in-picture (PIP) images 60 may be superimposed over a primary image generated on display device 28.

To establish a streaming video session, streaming media server 22 receives an initial transmission from client media receiver 24 via network 26. This initial transmission may include data identifying the content desirably streamed to client media receiver 24 and other information, such as data supporting authentication of the streaming media server 22 and client media receiver 24. Additionally, in embodiments wherein streaming media server, 22 assumes the form of a consumer placeshifting device, such as an STB or DVR located in the residence of an end-user, control commands or signals 62 may include instructions to remotely operate the placeshifting device, as appropriate. A streaming video session then ensues until termination by server 22 or receiver 24.

While highly useful, the above-described buffer occupancy techniques to select streaming ABR values may fail to adequately for variations in the processor load of server 22 and, thus, may provide little, if any, precautions measures against computationally-intensive surges or spikes in processing demands placed on the server processor. Consequently, undesirably high transient processor loads or processor hit to processor 44 may still occur, particularly during multiclient streaming video sessions, which may degrade the overall stability and responsiveness of the (e.g., multiclient) streaming session. Therefore, to further improve the overall ABR selection process in this regard, embodiments of the below-described memory allocation method further consider processor load measurements and RAM distribution so that the overall bit rate can be increased or the unused RAM can be utilized for other operations by the main processors.

For example, in embodiments, CPU average load analysis may be performed to identify when processor loading is undesirably high or is approaching certain upper limits; and, when this is the case, to perform certain preemptive measures (e.g., by reducing the ABR value in a controlled manner) to reduce processor load. In so doing, preemptive or remedial actions can be implemented when needed and in a highly responsive manner to further prevent or quickly resolve the placement of undesirably high processing demands on the processing architecture of the streaming media server. Exemplary methods that can be carried-out by streaming media server 22 in implementing such processor load-responsive bitrate selection schemes will now be described in conjunction with FIG. 2.

Figure 2:
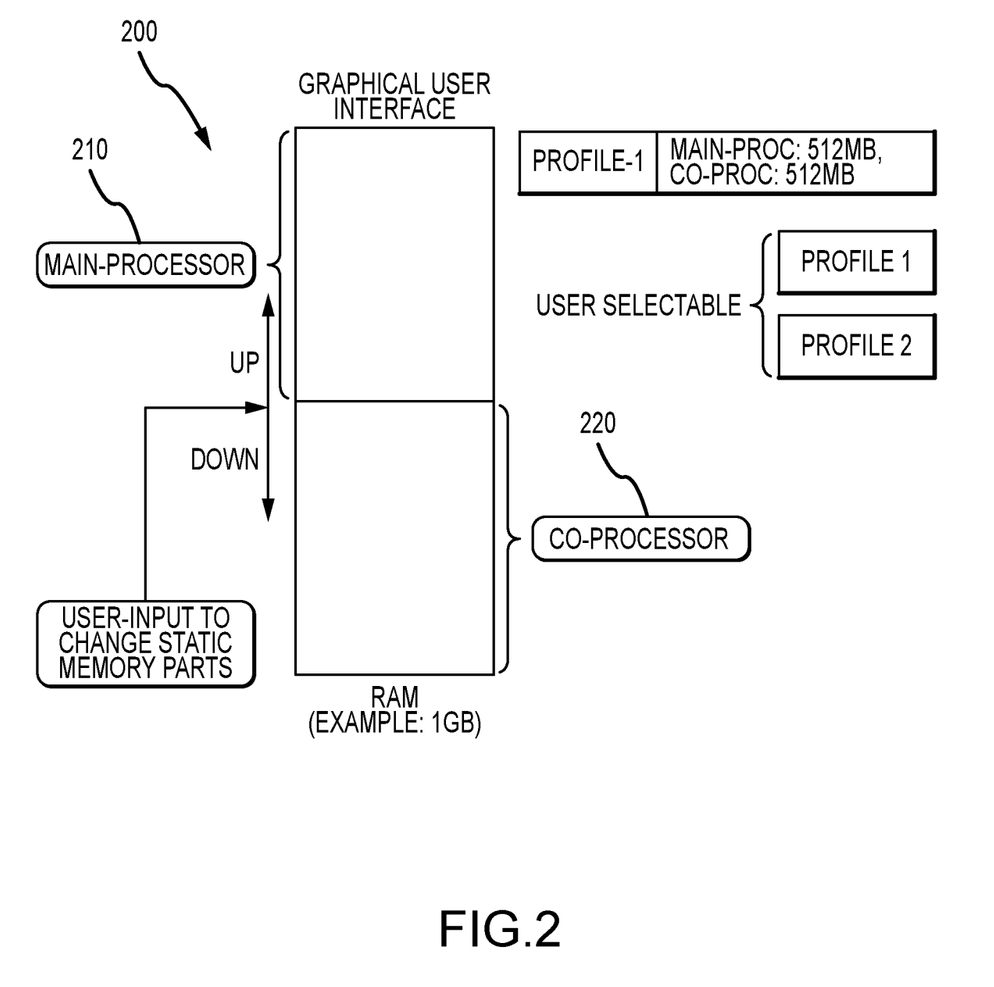
FIG. 2 depicts an exemplary diagram of memory allocation using a graphical user interface (GUI) that receives user input of an embodiment of a media device, such as a set-top box, which is suitable for use as a media presentation device in the media presentation system of FIG. 1.

FIG. 2 illustrates an exemplary GUI for a user to change RAM allocations in a profile dependent on use cases in accordance with an embodiment. The GUI 200 illustrates an exemplary RAM 210 in which the user can manipulate the RAM or choose a profile that is configuration of RAM. The GUI 200 is displays the available virtual memory that consists of a main processor RAM 210 and a co-processor RAM 220. The user via the GUI can shift up or down the amount of RAM between the main processor RAM 210 and the co-processor RAM 220. In this way, the user can manually manipulate the RAM that is shared between each processor. The virtual memory is simulated RAM. When all of the RAM in a machine being is used, the computer shifts data to an empty space on the hard drive. The box swaps data to the hard disk and back to the RAM as needed. When virtual memory is increased, the empty space reserved for RAM overflow increases. In order to change the virtual memory allocation, a user can access the GUI 200 and manipulate the amounts of static memory of the RAM 210 and the RAM 220 by selecting either and adjusting the size by movement of a marker in between either part. Alternately, the user can select a particular profile that associates certain performance characteristic to functionalities based on a number of preconfigured use cases. In other words, the user would not have to access the system properties settings (in an exemplary WINDOWS® operating system), and then manually go to Start>Run; Type sysdm.cpl and click OK; In the System Properties dialog box, click the Advanced tab; Under Performance, click Settings; In the Performance Options dialog box, click the Advanced tab; and then adjust the virtual memory setting. The GUI 200 provides a convenient click and select operation to visually see the static memory allocations, to adjust the static memory allocations and to select profiles with static memory allocated amongst sets of processors for various use cases to enhance performance characteristics of the processors.

Figure 3:
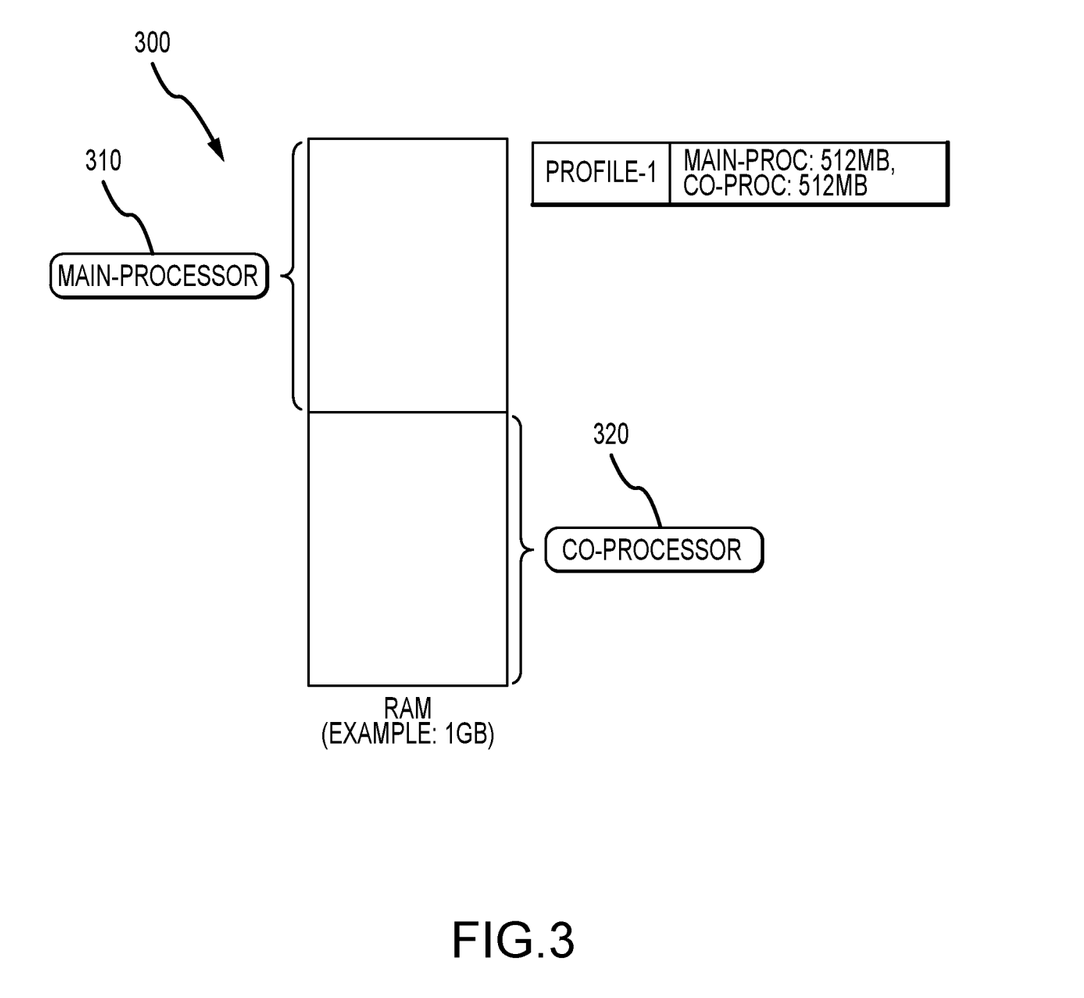
FIG. 3 depicts an exemplary diagram of memory allocation using the first profile of an embodiment of a media device, such as a set-top box, which is suitable for use as a media presentation device in the media presentation system of FIG. 1.

The table below describes "use case" scenarios and profiles associated therewith. For profile 1, the memory allocation is 50/50 split or an equal amounts of RAM split between the main processor and the co-processor where each is allocated 512 MB. With this static allocation of equal split static RAM for each processor, the use case-1 results in an optimal sub-use for two streaming, recording, encryption, and sending operation to send data to the client at 6 Mbps. In the use case-2 consisting of functionalities of 1 streaming+1 recording+1 encryption+1 operation to send data to the client at 12 Mbps, there is hidden unused RAM of about 50% of the available RAM or 256 Mbps. In other words, because the functionality of use case-2 is half that of use case-1, the resultant functionality is halved. This results in again suboptimal use of the available static RAM when selecting the profile 1. When selecting profile 2, the memory allocation is 768 MB for the main processor and 256 MB for the co-processor. The functionality consists of 1 streaming+1 recording+1 encryption+1 operation to send data to client at 20 Mbps. The unused allocated memory of 256 MB RAM in use case-2 is now used effectively with profile 2 in use case-3 because of the RAM allocation of more RAM (i.e., 768 MB) to the main processor and less RAM allocated to the co-processor (i.e., 256 MB). The static amount of the total RAM remains constant of 1024 MB or about 1 GB, but the split is not a 50/50 between the main processor and the co-processor but a 75/25 split of RAM allocated between the main processor and the co-processor.

allocated RAM space. In this use case 1, if the user is not using all the functionalities by the co-processor there will be unused RAM by the co-processor 320. The co-processor 320 unused RAM is configured as hidden unused RAM to the applications running in the main processor 310. Because the main processor 310 application is not provisioned to use the unused RAM, the memory allocation because of the unused RAM is deemed sub-optimal (i.e. profile 1 sub optimal use by the memory allocation of the main processor 512 MB and the co-processor 512 MB).

Figure 4:
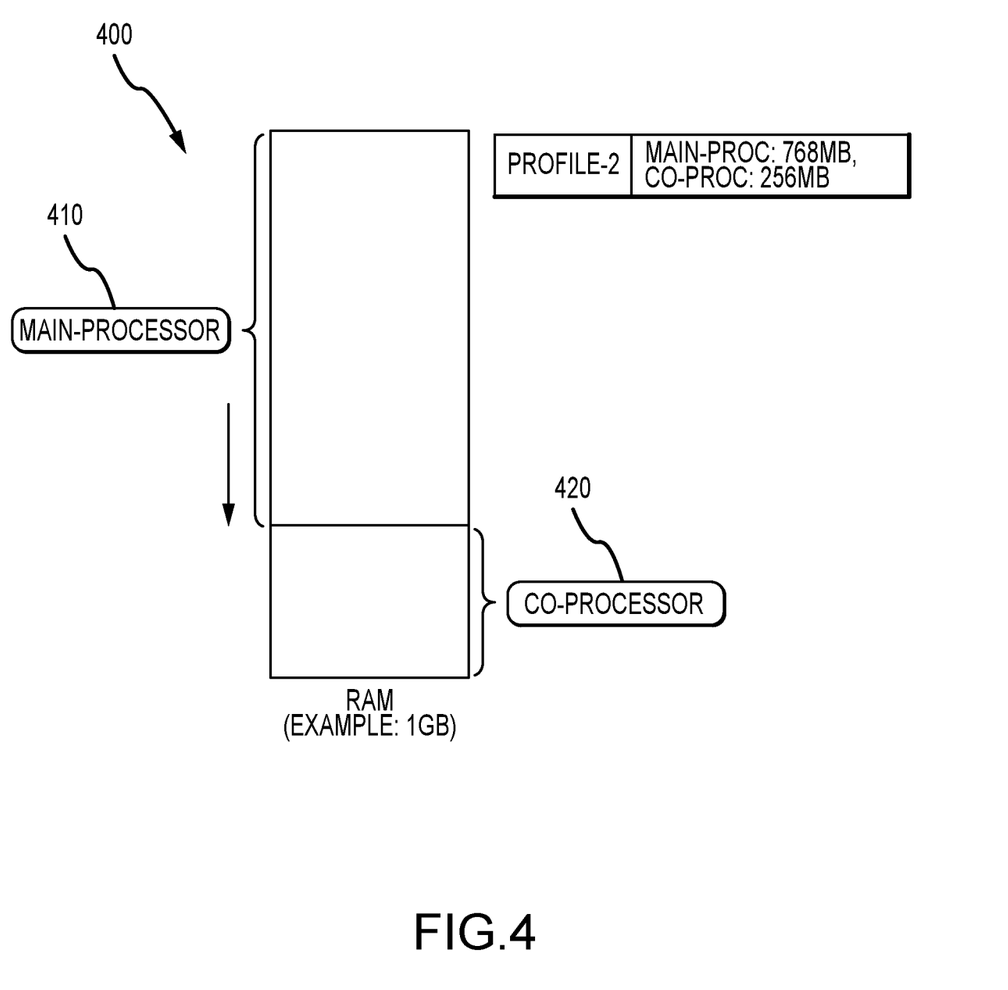
FIG. 4 depicts an exemplary diagram of memory allocation of a second profile of an embodiment of a media device, such as a set-top box, which is suitable for use as a media presentation device in the media presentation system of FIG. 1.

FIG. 4 is exemplary diagram of the GUI illustrating the 75/25 split of memory allocated between the main processor and the co-processor in accordance with an embodiment. FIG. 4 illustrates profile 2 with the main processor 400 configured statically to use the 512 MB plus 256 MB and the co-processor 420 configured to use the 256 MB of the RAM (i.e. exemplary 1 GB). The main processor 410 is configured to use a certain extra amount of RAM (i.e., 256 MB). The extra 256 MB is added to the main processor 410, which is unused in a use case when the co-processer is the only processor performing streaming (i.e., a single streaming functionality running) The unused RAM by the co-processor in this use case is more effectively used as it is allocated to features of the main processor 410.

| Profile | RAM configuration for main processor | RAM configuration for Co-processor | Use case/functionality examples |
|---|---|---|---|
| 1 | 512 MB | 512 MB | Use case-1:<br>2 streaming + 2 Recording +<br>2 Encryption + 2 operations<br>to send data to client @ 6 Mbps<br>Use case-2:<br>1 streaming + 1 Recording +<br>1 Encryption + 1 operations<br>to send data to client @ 12 Mbps<br>(In this case: there will be hidden unused RAM by the co-processor ~say 256 MB) |
| 2 | 768 MB | 256 MB | Use case-3:<br>1 Streaming + 1 Recording +<br>1 Encryption + 1 operations<br>to send data to client @ 20 Mbps<br>(Unused 256 MB RAM on Usecase-2, is used effectively on this usecase-3 and it is due to PROFILE-2 RAM configuration.) |
| 3 | X MB | X' MB | Use case-4 . . . |
| 4 | Y MB | Y' MB | Use case-5 . . . |

Figure 5:
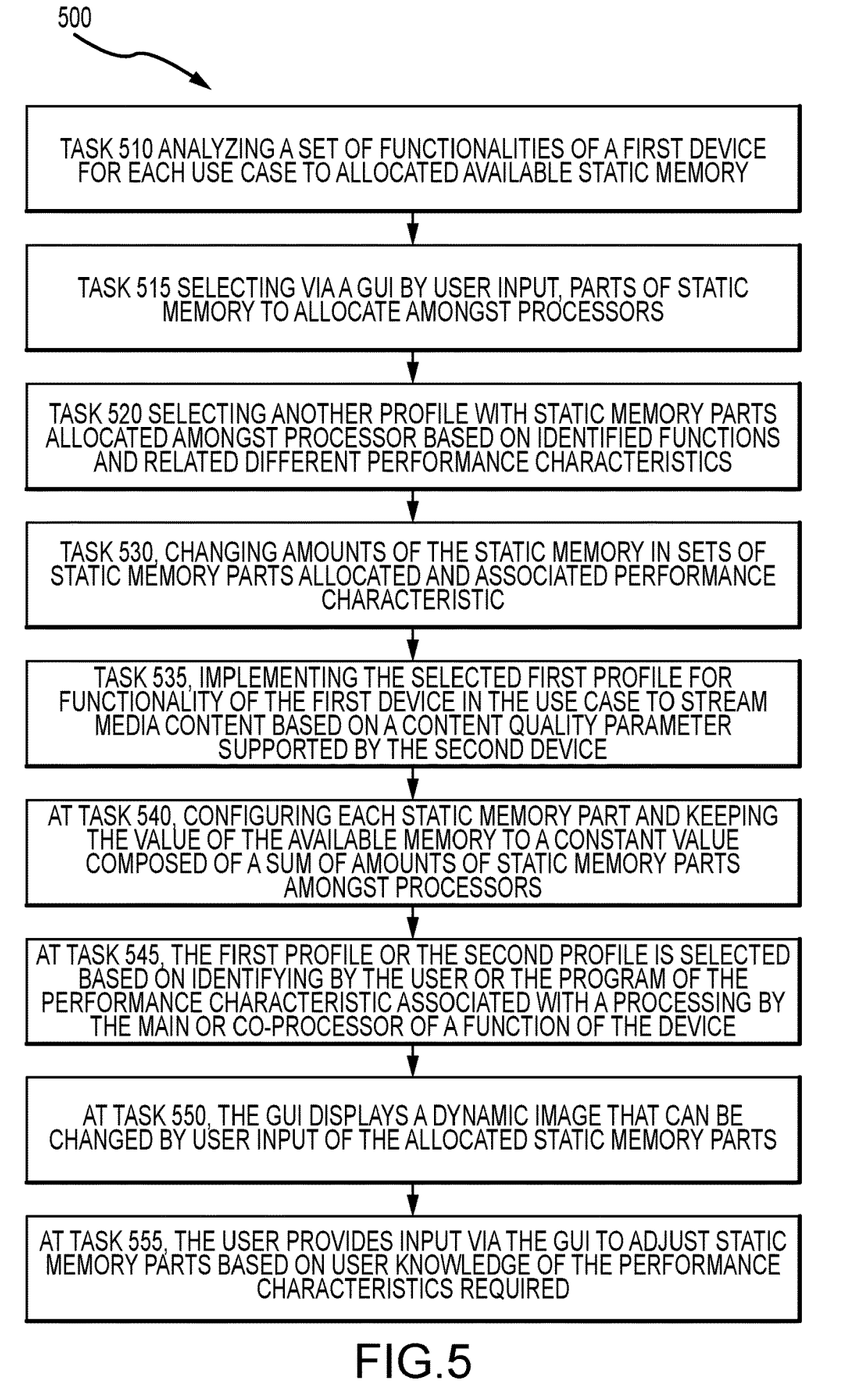
FIG. 5 is a flowchart of an exemplary memory allocation method, which may be carried out by the streaming media device in embodiments of the present disclosure.

FIG. 3 is an exemplary diagram of the GUI 300 illustrating the 50/50 split of memory allocated between the main processor and the co-processor in accordance with an embodiment. In FIG. 3, illustrates profile 1 with the main processor 310 configured statically to use the 512 MB and the co-processor 320 configured to use the 512 MB of the RAM (i.e. exemplary 1 GB). The main processor 310 is configured to use a certain amount of RAM (i.e. 512 MB). This memory allocation can be used to run functionality "X" which consists of 2 streaming+2 Recording, 2 Encryption, 2 networks that sends to the client any application specific operations at a bitrate of 6 Mbps. The bitrate for the application specific operation is limited by the RAM allocated space. The co-processor 320 is configured to use a certain amount of RAM of 1 GB minus 512 MB that results in 512 MB allocated for use. This memory allocation can be used to run functionality "Y" which consists of 2 transcoding, 2 recording at 6 Mbps that uses the configured or FIG. 5 is an exemplary flowchart illustrating the steps in allocating available static memory in a device or selecting a profile based on the performance characteristics of a device in accordance with an embodiment. In the flowchart 500, initially at task 505, upon being turned on, the device which may be a set-top box "boots up" by first performing a series of internal self-tests and then transferring the program instructions residing in the non-volatile memory to the main memory. Further at task 505, once the program instructions and any necessary data have been transferred to available memory, the processor of the device then starts executing the program instructions. In this case the program instructions can instruct an application to select a profile based on a default set of performance characteristics for processing functionalities of the device. In this case, the application will configure the static memory of the device with an allocation for each of the static memory parts. For example, allocate a 50/50 split between static memory allocated for processing by a main processor and by a co-processor. However, there may be instances when the original default configuration is not the optimal desired configuration and there is significant unused hidden static memory that could have been allocated to the main processor for a use case that enables functionalities with the main processor.

Next at task 510, a set of functionalities of a first device is analyzed based on a use case which is associated with configuring available static memory in processing at least one functionality of the first device. At task 515, via user input to a graphical user interface of the device, a profile can be selected by the user that allocates an amount of memory to a first part of the available memory associated with the main processor and to the second part of the available memory associated with the co-processor. At task 520, a second profile can be selected that is based on identifying by the user a different set of performance characteristics. At task 530, the memory allocation is changed to a different amount allocated to the first static memory part and to the second static memory part. In this second use case, the second profile manages the allocation of each part of the static memory and associated performance characteristic. At task 535, the selected first profile is used to implement the functionality of the first device in the use case, which is related to streaming media content with the equal memory allocation for the first static memory part and the memory allocation for the second static memory part. Also, the first and second static memory is allocated based on a content quality parameter supported by the second device.

At task 540, the available memory is configured as constant value composed of a sum of an amount of the first static memory part and the second static memory part which is not changed because an increase in the amount of the first static memory part results in a decrease in the amount of the second memory part and vice versa. Hence, the total amount of memory that is available in unchanged. At task 545, the first profile is selected based on identifying by the user or the program of the performance characteristic associated with a processing by the main or co-processor of a function of the device. Likewise, the second profile is identified by a second performance characteristic associated with processing the function by the first processor with the allocated available memory. At task 550, the graphical user interface can display in dynamic type image that can be changed by user input, the allocations of each memory part of the available static memory. At task 555, the user can provide using the graphical user interface, input that pertains to allocations of the available memory for configuring the available memory based on user knowledge of the performance characteristics that are needed. Also, feedback may be provided that is responsive to the user input, which is influenced by the performance characteristics associated with the second device (e.g., a remote device) communicating with the first device.

It should be noted that the general systems, structures, and techniques described above may be inter-combined, enhanced, modified, and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to broadcasting, streaming, networking, wireless communications, content distribution or delivery, communications standards or protocols, encoding/decoding standards or protocols, content formats, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments, the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method for configuring random-access memory (RAM) in a first device, the method comprising:
    displaying, during a booting of the first device, a first memory profile for selection via a graphical user interface (GUI) of the first device, comprising identifying a first performance characteristic associated with a first functionality of the first device, wherein the first memory profile comprises a first part for memory allocation of an available RAM to a first processor of the first device, and a second part for memory allocation of the available RAM to a second processor of the first device, and wherein the first device is a streaming media server and the first functionality corresponds to placeshifting media content;
    receiving, during the same booting of the first device, a selection of the first memory profile via the GUI; and
    changing, during the same booting of the first device, the allocation of the available RAM, comprising allocating the first part of the available RAM to the first processor and the second part of the available RAM to the second processor according to the first memory profile in response to selection of the first memory profile, wherein:
        allocating the second part releases, during the booting of the first device, unused RAM from a default memory allocation available to the second processor; and
        allocating the first part adds, during the booting of the first device, the released unused RAM to a default memory allocation available to the first processor.

2. The method of claim 1, wherein the first memory profile is based on a set of performance characteristics associated with a second device communicating with the first device.

3. The method of claim 2, wherein the first device is a streaming media server and the second device is a client media receiver.

4. The method of claim 1, wherein the first functionality corresponds to video streaming.

5. The method of claim 1, further comprising:
displaying a second memory profile for selection via a graphical user interface (GUI), comprising identifying a second performance characteristic associated with the first functionality of the first device, wherein the second memory profile comprises a third part for memory allocation of an available RAM to the first processor of the first device, and a fourth part for memory allocation of the available RAM to the second processor of the first device, and wherein the first part is different than the third part and the second part is different than the fourth part.

6. The method of claim 5, further comprising:
allocating, while booting the first device, the third part of the available RAM to the first processor and the fourth part of the available RAM to the second processor according to the second memory profile in response to selection of the second memory profile.

7. The method of claim 1, further comprising:
displaying a user-selectable marker between a graphical representation of the memory allocation to the first processor of the first device and a graphical representation of the memory allocation to a second processor of the first device, wherein the marker is moveable by the user to select a fifth part for memory allocation of an available RAM to the first processor of the first device, and a sixth part for memory allocation of the available RAM to the second processor of the first device.

8. The method of claim 7, further comprising:
configuring a relationship of an amount of allocated RAM of the fifth part to the amount of allocation RAM of the sixth part, wherein a change in the first part by movement of the marker is compensated by an opposite change in the second part, wherein a total sum of the fifth part and the sixth part remains a constant value.

9. The method of claim 5, further comprising:
providing, via the GUI, an indication of the allocation of the available RAM to the first processor and the second processor resulting from the selection of one of the memory profiles.

10. A media system comprising a first processor, a second processor, random-access memory (RAM), and non-transitory storage, wherein the non-transitory storage comprises computer-executable instructions that, when executed by the processor, perform an automated process that comprises:
displaying, during a booting of the media system, a first memory profile for selection via a graphical user interface (GUI) of the media system, comprising identifying a first performance characteristic associated with a first functionality of the media system, wherein the first memory profile comprises a first part for memory allocation of an available RAM to the first processor of the media system, and a second part for memory allocation of the available RAM to the second processor of the media system, and wherein the media system is a streaming media server and the first functionality corresponds to placeshifting media content;
receiving, during the same booting of the media system, a selection of the first memory profile via the GUI; and
changing, during the same booting of the media system, the allocation of the available RAM, comprising allocating the first part of the available RAM to the first processor and the second part of the available RAM to the second processor according to the first memory profile in response to selection of the first memory profile, wherein:
allocating the second part releases, during the booting of the media system, unused RAM from a default memory allocation available to the second processor; and
allocating the first part adds, during the booting of the media system, the released unused RAM to a default memory allocation available to the first processor.

11. The system of claim 10, wherein the first memory profile is based on a set of performance characteristics associated with a second device communicating with the media system.

12. The system of claim 11, wherein the media system is a streaming media server and the second device is a client media receiver.

13. The system of claim 10, wherein the first functionality corresponds to video streaming.

14. The system of claim 10, wherein the automated process further comprises:
displaying a second memory profile for selection via a graphical user interface (GUI), comprising identifying a second performance characteristic associated with the first functionality of the media system, wherein the second memory profile comprises a third part for memory allocation of an available RAM to the first processor of the media system, and a fourth part for memory allocation of the available RAM to the second processor of the media system, and wherein the first part is different than the third part and the second part is different than the fourth part.

15. The system of claim 14, wherein the automated process further comprises:
allocating, while booting the media system, the third part of the available RAM to the first processor and the fourth part of the available RAM to the second processor according to the second memory profile in response to selection of the second memory profile.

16. The system of claim 10, wherein the automated process further comprises:
displaying a user-selectable marker between a graphical representation of the memory allocation to the first processor of the media system and a graphical representation of the memory allocation to a second processor of the media system, wherein the marker is moveable by the user to select a fifth part for memory allocation of an available RAM to the first processor of the media system, and a sixth part for memory allocation of the available RAM to the second processor of the media system.

17. The system of claim 16, wherein the automated process further comprises:
configuring a relationship of an amount of allocated RAM of the fifth part to the amount of allocation RAM of the sixth part, wherein a change in the first part by movement of the marker is compensated by an opposite change in the second part, wherein a total sum of the fifth part and the sixth part remains a constant value.

18. A method for configuring random-access memory (RAM) in a first device, the method comprising:

determining a first memory profile, comprising identifying a first performance characteristic associated with a first functionality of the first device, wherein the first memory profile comprises a first part for memory allocation of an available RAM to a first processor of the first device, and a second part for memory allocation of the available RAM to a second processor of the first device, and wherein the first device is a streaming media server and the first functionality corresponds to placeshifting media content;

determining a second memory profile, comprising identifying a second performance characteristic associated with the first functionality of the first device, wherein the second memory profile comprises a third part for memory allocation of the available RAM to a first processor of the first device, and a fourth part for memory allocation of the available RAM to a second processor of the first device;

selecting the first memory profile, by the first device during a booting of the first device, for allocating the available RAM to the first and second processors, wherein the selection is based on a performance characteristic associated with a second device communicating with the first device; and changing, during the same booting of the first device, the allocation of the available RAM, comprising allocating the first part of the available RAM to the first processor and the second part of the available RAM to the second processor according to the first memory profile in response to selection of the first memory profile, wherein:

allocating the second part releases, during the booting of the first device, unused RAM from a default memory allocation available to the second processor; and allocating the first part adds, during the booting of the first device, the released unused RAM to a default memory allocation available to the first processor.

19. The method of claim 18, wherein:
the second device is a client media receiver;
the first functionality corresponds to video streaming; and
the performance characteristic associated with a second device communicating with the first device comprises a content quality parameter supported by the second device.

20. The method of claim 18, further comprising:
monitoring, by a processor load monitoring module, a load of the first processor, and wherein the selection of the first memory profile is further based on the monitored load of the first processor.

* * * * *